UNITED STATES PATENT OFFICE.

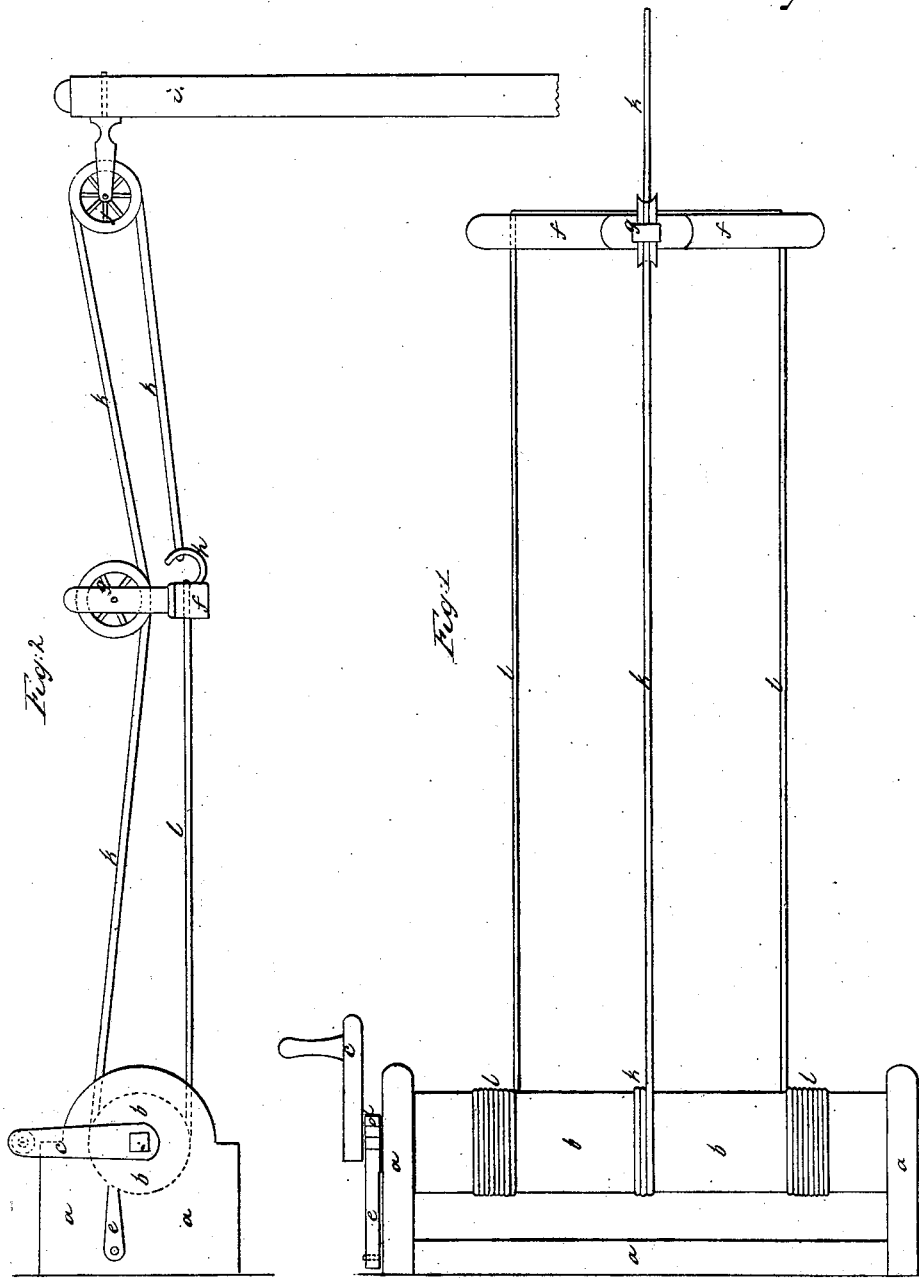

JAMES W. EPPERSON AND THOMAS W. FARRELL, OF WOODHULL, ILL.

IMPROVED CLOTHES-DRIER.

Specification forming part of Letters Patent No. 53,797, dated April 10, 1866.

*To all whom it may concern:*

Be it known that we, JAMES W. EPPERSON and THOMAS W. FARRELL, both of Woodhull, in the county of Henry and State of Illinois, have invented a new and Improved Clothes-Drier; and we do hereby declare that the following is a full and exact description thereof, reference being had to the accompanying drawings, as making a part of this specification, in which—

Figure 1 is a perspective view or plan of our improved clothes-drier. Fig. 2 is a longitudinal view of the same as adjusted for use.

Like letters in different figures of the drawings indicate the same parts.

The nature of our improvement consists in attaching two or more lines or ropes to a roller or axle at one end and to a bar or head-block at the other end in such a manner that the lines or ropes may be wound upon the axle or unwound by means of another cord or track-line, which is operated by means of a combination of pulleys and the axle or windlass.

To enable others to make and use our invention, we will proceed to describe its construction and operation.

We first construct a frame, $a\ a\ a$, Fig. 1, which supports a roller or axle, $b$, by means of pivots or spindles at the ends of the axles, which pass through the frame $a\ a\ a$ at each end.

At one end of the axle $b$ is attached a crank, $c$, also a small cog-wheel, $d$, and a latch or dog, $e$, which drops between the cogs in wheel $d$ to hold the axle at any point in its revolution. We then construct a bar or head-block, $f$, with a plate-pulley, $g$, attached to the center on top of head-block $f$. There is also attached to the rear of head-block $f$ a hook, $h$, as is shown in Fig. 2. Then to a stationary beam or post, $i$, is attached the pulley $j$. We then attach to the axle $b$ a cord or track-line, $k$, and pass it thence under the plate-pulley $g$, thence over and around pulley $j$, and back to hook $h$, to which it is fastened.

The clothes-lines or cords $l$ are attached at one end to the axle $b$ and the other ends to the head-block $f$, and when thus adjusted, by turning the crank $c$, the clothes-lines $l$ are wound around the axle $b$ and the track-line $k$ is unwound, while the head-block $f$ is drawn along the track-line toward the axle; and by turning the crank in the opposite direction head-block $f$, with the lines $l$, are drawn from the axle toward the post $i$ by means of the track-line $k$ acting in combination with the hook $h$, pulley $j$, and the axle.

What we claim as our invention, and desire to secure by Letters Patent, is—

1. The movable head-block $f$, in combination with pulley $g$ and hook $h$, substantially as and for the purpose described.

2. The axle $b$, in combination with the head-block $f$ and the lines $l$ and $k$, substantially in the manner and for the purposes described.

JAMES W. EPPERSON.
THOMAS W. FARRELL.

Witnesses:
JNO. C. STEWART,
O. F. PRICE.